United States Patent [19]

Abruna

[11] Patent Number: 5,495,302
[45] Date of Patent: Feb. 27, 1996

[54] TELEVISION RECEIVER VIEWING DISTANCE SENSOR SWITCH

[76] Inventor: Manuel Abruna, Box 183, Ciales, Puerto Rico, 00638

[21] Appl. No.: 242,593

[22] Filed: May 13, 1994

[51] Int. Cl.$^6$ .......................... H04N 5/64; G08B 13/18; G08B 23/00
[52] U.S. Cl. .................. 348/819; 348/818; 348/820; 348/143; 348/155; 340/567; 340/573
[58] Field of Search .................................. 348/818, 819, 348/820, 164, 143, 155, 553, 725, 730, 633, 603; 340/541, 573, 571, 751, 565, 937, 573, 567

[56] References Cited

U.S. PATENT DOCUMENTS

| | | | |
|---|---|---|---|
| 4,321,593 | 3/1982 | Ho et al. | 348/819 |
| 4,417,278 | 11/1983 | Hensleigh et al. | 348/818 |
| 4,716,469 | 12/1987 | Kim et al. | 348/818 |
| 4,831,448 | 5/1989 | Park | 348/818 |
| 4,835,614 | 5/1989 | Ryu | 348/818 |

*Primary Examiner*—Edward L. Coles, Sr.
*Assistant Examiner*—Allan A. Esposo

[57] ABSTRACT

A television receiver radiation exposure limiting apparatus including a power supply, a proximity sensor, a rf switch, and a housing wherein the apparatus may be located within a small housing emplaced on the television receiver. The preferred proximity sensor comprises a monostatic infrared type sensor and responds to the comparative infrared signature of a human referenced to the ambient background. The sensor generates an electrical output signal which either stimulates or terminates conduction of electric current in an rf relay or solid state switch whenever a human form is within a preset detection range. A system in which the sensor signal terminates current flow is preferred. The rf relay or solid state switch connects the incoming rf signals representing unprocessed video and audio information to the VHF/UHF input of the television receiver only when no human signature is detected by the proximity sensor.

4 Claims, 2 Drawing Sheets

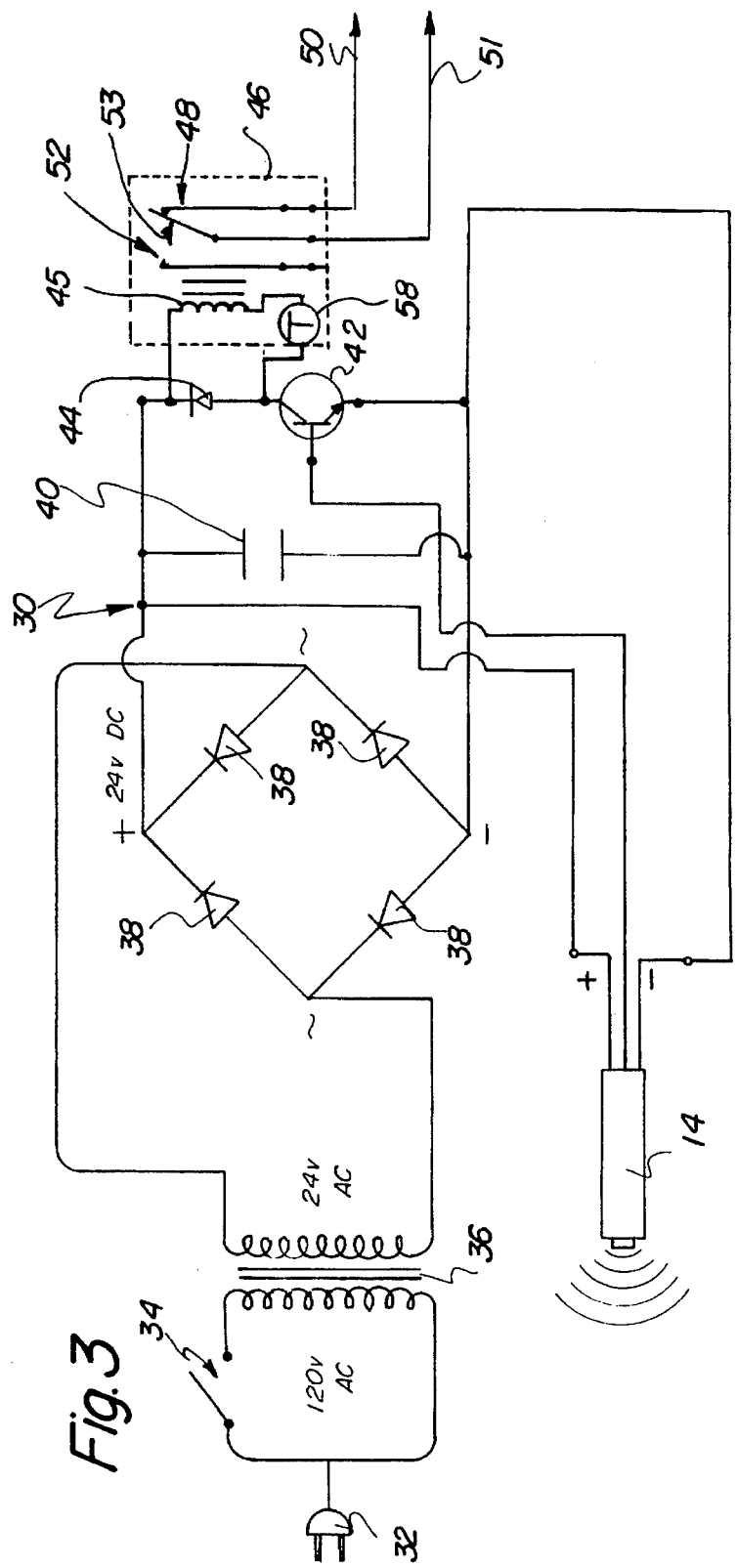
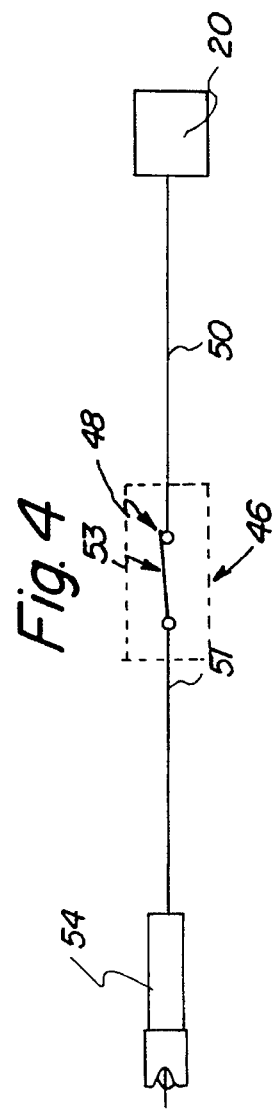
Fig. 3
Fig. 4

TELEVISION RECEIVER VIEWING DISTANCE SENSOR SWITCH

BACKGROUND OF THE INVENTION

1. Field of the Invention

The present invention relates to methods for limiting human exposure to the ionizing and electromagnetic fields emanating from a television receiver and more particularly pertains to a television receiver viewing distance sensor switch which may be utilized for reducing or eliminating radiative emissions from a television receiver when potential viewers are positioned within a preset range.

2. Description of the Prior Art

The use of devices to limit human exposure of television receiver radiation is known in the prior art. More specifically, television receiver radiation exposure limiting apparatus heretofore devised and utilized for the purpose of reducing human exposure of ionizing and electromagnetic radiation emissions are known to consist basically of familiar, expected and obvious structural configurations, notwithstanding the myriad of designs encompassed by the crowded prior art which have been developed for the fulfillment of countless objectives and requirements.

For example, U.S. Pat. No. 4,417,278 to Hensleigh et al discloses a television receiver scrambling system wherein a sensor actuated radio frequency transmitter is employed to disrupt the video and audio portions of any proximate television receiver whenever a human form approaches within a preset range of the sensor device. Sensors disclosed in the Hensleigh invention include an acoustic transducer and a tuned pickup coil, and furthermore there exists no hardwire link between the television scrambling system and the television receiver. The present invention employs a sensor actuated device which removes incoming information signals from the television receiver using a hardwire ling thereby obviating the requirement for additional electromagnetic radiation whenever a preset range is encroached therein.

In U.S. Pat. No. 4,835,614 to Ryu a control method for limiting watching distance in television is disclosed. The Ryu invention comprises the algorithm required to preclude interference of infrared signals from a remote control transmitter and a watch-distance-limit-device. The present invention discloses, in the language of the Ryu invention a watch-distance-limit-device and is not associated with algorithm requirements.

In U.S. Pat. No. 4,321,593 to Ho et al. a television set with supervisory functions of alarming burglary and safe watching distance is described. The Ho et al. apparatus is necessarily a complex electronic assembly comprising a moving target type sensor, a signal processor, an indication or alarm, a means for removing power from an interconnected television receiver, a power supply for both external and internal electronic controls, and an interconnection to the detected video or intermediate frequency channel of the television receiver to provide video blanking. Installation of the Ho et al. apparatus requires access to the interior workings of the television receiver and is likely to be performable by only qualified service personnel. The present invention is a remarkably simple device which may be installed by unscrewing the external lead wire or coaxial cable Ultra High Frequency/Very High Frequency (UHF/VHF) signal input to the television receiver and introducing a threaded mating component in a series relationship with the UHF/VHF signal input and the television receiver. Additionally, the present invention does not inject video blanking signals at the intermediated frequency or the video channel of the television receiver, a simple disconnect of the UHF/VHF signal input is described in the preferred embodiment, however an alternate embodiment introduces a video blanking signal at the UHF/VHF signal input terminals. The present invention requires no access or connections to the internal portion of the television receiver and therefore is suited for safe and proper installation by untrained personnel. And furthermore, the present invention employs a proximity sensor not requiring motion to generate an alarm signal.

In U.S. Pat. No. 4,835,614 to Kim et al. a circuit for eyesight protection in a television set is disclosed. The Kin et al. circuit comprises an infrared optical transmitter, an infrared optical receiver, and an internal interconnection to the video amplifier portion of the attached television receiver. Should a human form approach within a preset detection range, pulsed infrared radiation from the transmitter having been reflected from the human form and exceeding a particular amplitude and time threshold at the receiver, forces deactivation of the video amplifier section of the interconnected television receiver thereby blanking the screen. The Kim et al. patent is directed toward limiting viewing distance from a television receiver for the worthy purposed of maintaining viewer eyesight. The present invention does not require a pulsed transmitter for operation and has no interconnections internal to the television receiver.

In U.S. Pat. No. 4,831,448 to Park a viewing distance sensor for television receiver is disclosed. The Park invention comprises a monostatic infrared proximity sensor designed to operate without mutual optical interference with any other electronic control device operating in the area. A disadvantage in this prior art lies in a requirement for an internal interconnection of the sensor to the portion of the television receiver circuit which generates the image signal and the requirement for a transmitter and receiver. The present invention does not require any internal link with television receiver components and furthermore prefers a simpler passive infrared proximity sensor.

As illustrated by the background art, efforts are continuously being made to attempt to improve the state-of-the-art of devices limiting the proximity of human viewers of television receivers. No prior effort, however, provides the benefits attendant with the present invention. Additionally, the prior patents and commercial techniques do not suggest the present inventive combination of component elements arranged and configured as disclosed and claimed herein.

Therefore, it can be appreciated that there exists a continuing need for television receiver viewing distance sensor switch which can be employed to provide safe viewing of television programming by the general population. In this regard, the present invention substantially fulfills this need.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types now present in the prior art, the present invention provides an improved television receiver viewing distance sensor switch construction wherein the same can be utilized for limiting the radiation exposure of human television viewers. As such, the general purpose of the present invention, which will be described subsequently in greater detail, is to provide a new and improved television receiver radiation exposure limiting apparatus and method which has all of the advantages of the prior art television receiver radiation exposure limiting apparatus methods and none of the disadvantages.

The invention is defined by the appended claims with the specific embodiment shown in the attached drawings. For the purpose of summarizing the invention, the invention may be incorporated into a device mounted externally upon a television receiver wherein the device comprises a proximity sensor and associated electronics providing for the closure of a radio frequency (rf) style relay interconnected in a series fashion with an incoming UHF/VHF rf signal and the television receiver. In the event of a human form approaching within a predesignated range the relay will change state thereby removing the rf UHF/VHF signal from the input line. The result is the loss of image and the production of a random array of everchanging black and white splotches commonly termed "snow", or the result may be a loss of raster which is accompanied by loss of potentially harmful ionizing radiation, ie. low energy x-rays, and to a lesser extent, mitigation of electromagnetic radiation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention may be better understood so that the present contribution to the art can be more fully appreciated. Additional features of the invention will be described hereinafter which form the subject of the claims of the invention. It should be appreciated by those skilled in the art that the conception and the disclosed specific methods and structures may readily be utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved television receiver viewing distance sensor switch.

It is an additional object of the present invention to provide a new and improved television receiver viewing distance sensor switch which has all the advantages of the prior art and none of the disadvantages.

It is another object of the present invention to provide a new and improved television receiver viewing distance sensor switch which may be easily and efficiently manufactured and marketed.

It is a further object of the present invention to provide a new and improved television receiver viewing distance sensor switch which is of a durable and reliable construction.

An even further object of the present invention is to provide a new and improved television receiver viewing distance sensor switch which is susceptible of a low cost of manufacture with regard to both materials and labor, and which accordingly is then susceptible of low prices of sale to the consuming public, thereby making such television receiver radiation exposure limiting apparatus economically available to the buying public.

Still yet another object of the present invention is to provide a new and improved television receiver viewing distance sensor switch which provides in the apparatuses and methods of the prior art some of the advantages thereof, while simultaneously overcoming some of the disadvantages normally associated therewith.

Still another object of the present invention is to provide a new and improved television receiver viewing distance sensor switch which serves a purpose of rendering television receivers substantially inoperative whenever a human views the television screen at ranges below a preset minimum.

Yet another object of the present invention is to provide a new and improved television receiver viewing distance sensor switch which incorporates an rf relay switch which facilitates disconnection of incoming UHF/VHF signals thereby providing the television view with enhanced protection from the exposure effects of television generated ionizing and electromagnetic radiation.

Even still another object of the present invention is to provide a new and improved television receiver viewing distance sensor switch apparatus thereby having a beneficial impact on the television receiver radiation exposure limiting apparatus industry in general.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention.

Many other beneficial results can be attained by applying the disclosed invention in a different manner or by modifying the invention within the scope of the disclosure. Accordingly, other objects and a fuller understanding may be had by referring to the summary of the invention and the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a circuit diagram of the television receiver viewing distance sensor switch.

FIG. 4 is an interconnect circuit diagram of the television receiver viewing distance sensor switch showing the link between the apparatus and the television receiver.

DESCRIPTION OF THE PREFERRED EMBODIMENT

Figure 1:
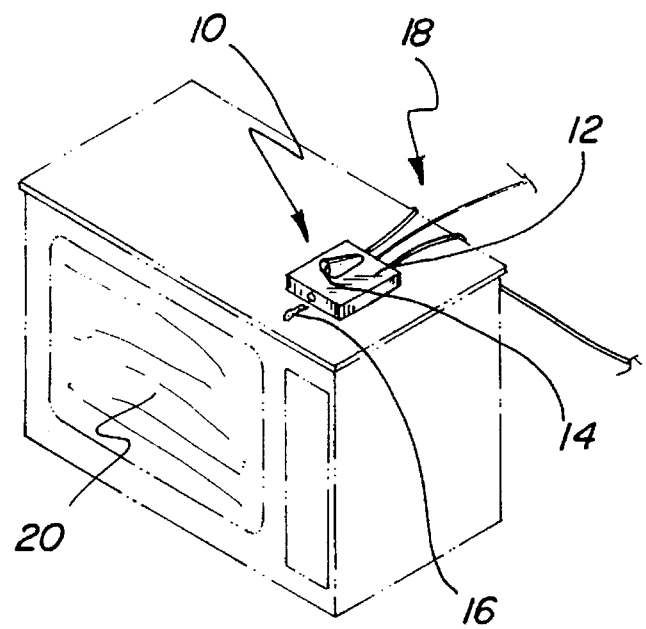
FIG. 1 is a front perspective view of the television receiver viewing distance sensor switch showing placement on a television receiver.
Figure 2:
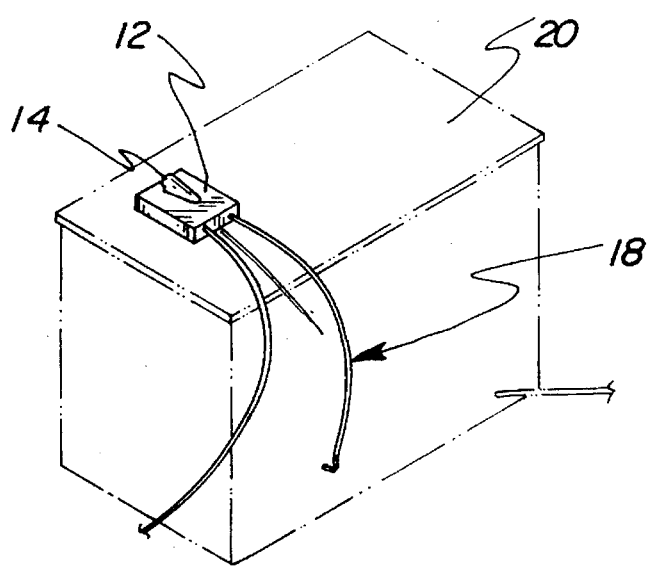
FIG. 2 is a rear perspective view of the television receiver viewing distance sensor switch showing interconnections.

With reference now to the drawings, and in particular to FIG. 1 thereof, a new and improved television receiver viewing distance sensor switch embodying the principles and concepts of the present invention and generally designated by the reference numeral 10 will be described.

From an overview standpoint, the television receiver viewing distance sensor switch 10 is adapted for use by a human to establish a minimum viewing distance for a television receiver within which the function of the receiver is impaired to an extent that the viewer will be required to move to a more remote location to enable viewing of a television program. Resultant from the undesirable viewing condition at close range and subsequent removal of viewers to more remote locations is a lowering of net viewer exposure to potentially harmful radiations emanating from a television receiver. Radiation categories generally considered potentially harmful are ionizing radiation such as soft x-rays generated by accelerated electron collision with internal television picture tube components and electromagnetic radiation from sources such as magnetic deflection coils and flyback transformers. The television receiver radiation exposure limiting apparatus 10 comprises a housing 12, a proximity sensor 14, a keyed on/off switch 16, and interconnecting cables 18. The television receiver radiation exposure limiting apparatus 10 is mounted on a top or side of a television receiver 20 and may be permanently affixed using adhesives, or be detachable using hook and loop type fasteners, or simply rest on the television 20 top surface.

More specifically, it will be noted that the television receiver radiation exposure limiting apparatus 10 comprises a housing 12 having an electronic circuit 30 within. Electronic circuit 30 comprises a power input and control section, an ac to dc power converter section, a sensor section, a delay section, a switch, and a control relay. See FIG. 3. The power input and control section comprises a wall plug 32 and a key operated on/off switch 34 in a series interconnection with the primary winding of transformer 36. A circuit breaker or fuse and a power on indicator light may be included.

The power converter section comprises transformer 36, full wave bridge rectifier comprising four diodes 38, and filter capacitor 40 wherein a sinusoidal ac line input produces twenty four volts dc with inconsequential ripple when measured across capacitor 40. The twenty four volt output from the power converter section is applied to the power input of sensor 14 and to a series interconnection of an NPN transistor 42 and a parallel circuit comprising diode 44 and the energizing coil 45 with timer 58 of relay 46. The collector of transistor 42 is interconnected with the energizing coil and the timer of the relay. The emitter of transistor 42 interconnects the low voltage reference of capacitor 40 thereby providing a complete circuit.

The base of transistor 42 interconnects the output of sensor 14. Sensor 14 comprises a passive infrared detector having one or more zones in which the presence of a human body is detected by comparing the temperature of the body with that of the background. If a warm body occupies a solid angular space indicative of human presence within an unsafe distance as preset in the detector, the sensor 14 provides a lesser signal to the base of transistor 42, thereby causing the electronic current to flow from the emitter to the collector of transistor 42 and causing the timer 58 to initiate counting toward preestablished settings. When counting is completed and the lesser signal remains at the base of the transistor, the timer will open contact 53 from contact 48, thus interrupting the incoming UHF/VHF signal to the television receiver 20. In order for the UHF/VHF signal to be reestablished to the television receiver, the warm body present in the space must be removed.

Current flow through transistor 42 must of necessity pass through the energizing coil 45 of relay 46 in the presence of a significantly high voltage at the base of transistor 42 to maintain the contacts of relay 46 in a closed state. When sensor 14 removes the signal from the base of transistor 42 when detecting a person within the detection range transistor 42 ceases conduction and the relay is de-energized thereby changing the state of contact 48 and contact 53 and opening the circuit from incoming UHF/VHF to the television receiver 20. When the warm body is removed beyond the hazardous range sensor 14 transmits a significant signal to the base of transistor 42 thereby preventing current from flowing through transistor 42 and causing the timer 58 to initiate counting toward preestablished settings. When counting is completed and the significant signal remains at the base of the transistor, the timer will close contact 53 to contact 48, thus allowing the incoming UHF/VHF signal to reach the television receiver 20. In order for the UHF/VHF signal be interrupted to the television receiver, a warm body must be placed in the space.

The operation described in the foregoing prevents a user from defeating the purpose of the television receiver radiation exposure limiting apparatus 10 by removing power as in extracting wallplug 32. An alternate circuit configuration not having the feature preventing disablement by removing power and being more efficient from power consumption, reliability, and cost viewpoints involves application of a significant voltage signal from sensor 14 to the base of transistor 42 whenever a human enters the unsafe sensory zone. Relay 14 would then be energized and the contact arrangement required would provide a disconnect of the incoming UHF/VHF line.

Diode 44 safely shunts the potentially damaging transient reverse current produced when current flow through energizing coil 45 terminates abruptly. If the aforementioned contact closure arrangement is employed the key switch 34 may be equipped with a third position which applies twenty four volt direct current power to coil 45 of relay 46 whenever the third position is selected thereby providing a test override feature for service technicians. Radio frequency signal lines 50 and 51 mate with the incoming television receiver UHF/VHF signal line and the UHF/VHF input to the television receiver 20 or, if an intermediated unit such as a video recorder (VCR), satellite converter unit, or cable television selection box are used, lines 50 and 51 interconnect the incoming UHF/VHF signals using a jack 54 and the respective intermediate unit UHF/VHF. See FIG. 4.

Lines 50 and 51 may comprise any one or a combination thereof of coaxial cabling or three hundred ohm transmission line. Relay 46 may or may not be of double throw form wherein the line 50, being connected to the television receiver 20 or intermediate unit, is either connected to one contact 52 or the other 54. If the double throw arrangement is employed the state wherein the relay 46 is disconnected may be used to ground line 50 or to inject a local signal which would appear on line 51. If line 50 is grounded the video signal is effectively removed and a dark screen results, provided that capacitive coupling of the incoming radio frequencies is not employed. If a signal is injected any local pattern such as an audio-visual warning can be introduced and be caused to appear on the television receiver 20 viewing screen as well as be heard over the audio channel.

A temporal delay is required to minimize the effects of persons briefly moving in and out of range and to reduce false alarms resulting from the passage of clouds impacting the heating/cooling of objects which the sensor 14 is using as background reference. A relay having a built in timer using physical or electronic timing means, or an external timer comprising a simple resistor capacitor network, or a 555 type timer configured as a monostable multivibrator, or a digital timer of one of a multitude of architectures may be effectively employed to produce time delays in the tens of second domain required for this feature.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

In yet another alternate embodiment housing 12 is integrated within the television receiver 20 housing by introduction of the television receiver radiation exposure limiting apparatus at a receiver manufacturing level. Sensor 14 is located in any of the free areas of the front face of the television receiver. The ultrasonic generator may also be integrated within the receiver 20 housing.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope on the invention.

What is claimed as being new and desired to be protected by LETTERS PATENT of the United States is as follows:

1. A television receiver viewing distance sensor switch for limiting the viewer-receiver separation distance by removing a primary receiver input radio frequency signal to a television receiver when a viewer is positioned closer than a preset distance comprising:

a hollow housing;

coupling means for securing the housing to the television receiver; and an electronic circuit within the housing having a power input and control section, an ac to dc power converter section, a sensor section, a control relay, a switch, and a delay section, the power input and control section including a wall plug extended from the housing and interconnected with a key operated on/off switch and wherein the power input and control section receives an external alternating current input, the ac to dc power converter section including a transformer with a primary coil and a secondary coil and with the primary coil interconnected in series with the wall plug and the key operated on/off switch of the power input and control section, a full wave bridge rectifier formed of four diodes interconnected with the secondary coil of the transformer, and a filter capacitor interconnected across the bridge rectifier and wherein the alternating current input from the power input and control section is converted by the ac to dc power converter section into a low voltage filtered direct current output having inconsequential ripple, the sensor section being formed of a sensor having a power input interconnected across the filter capacitor of the ac to dc power converter section and a power output for providing an electrical signal output indicative of human presence within a detection range as preset in the sensor and another electrical signal output indicative of no human presence within the detection range, the control relay being formed of an electromechanical relay having an energizing coil and a pair of associated spaced and closeable contacts and with the contacts being terminated with a pair of radio frequency signal lines that are interconnectable with an incoming television receiver signal line of the television receiver, the electromechanical relay allowing, in a first state, a substantially unattenuated passage of the primary receiver input radio frequency signal to the television receiver when the contacts are closed and prohibiting, in a second state, a passage of the primary receiver input radio frequency signal to the television receiver when the contacts are open, the switch including a NPN transistor having a base, an emitter, and a collector and with the base interconnected with the power output of the sensor for receiving the electrical signal output therefrom and the emitter interconnected between the power input of the sensor and the filter capacitor of the ac to dc power converter section, the switch also including a diode interconnected to the collector of the transistor and further interconnected between the filter capacitor of the ac to dc power converter section and the energizing coil of the control relay, and with the diode used for shunting potentially damaging transient reverse current flow when current flow through the energizing coil terminates abruptly, and the delay section being formed of a timer interconnected between the collector of the transistor and the energizing coil of the control relay for providing a temporal delay between the appearance of the electrical signal output from the sensor as delivered through the transistor to thereby delay subsequent placement of the control relay in one of its states.

2. The television receiver viewing distance sensor switch of claim 1 wherein said sensor is a passive infrared sensor responding to human presence by detecting a subtle temperature difference between a human form and an associated ambient background.

3. The television receiver viewing distance sensor switch of claim 1 wherein said sensor is a monostatic infrared detector wherein a pulsed infrared signal is transmitted into a substantial solid angle of space opposite a viewed direction of said television receiver, and a substantially co-located infrared receiver detects any reflected infrared signals from the pulse infrared signal that exceed a particular amplitude threshold and furthermore provides an electronic analog signal of said reflected infrared signals with said electronic analog signal being processed by electronic circuit components wherein a signal of appreciable amplitude is produced whenever any said reflected infrared signals exceed said amplitude threshold.

4. The television receiver viewing distance sensor switch of claim 1 wherein said sensor is a monostatic ultrasonic detector in which a pulsed or continuous ultrasonic signal is transmitted into a substantial solid angle of space opposite a viewed direction of said television receiver, and a substantially co-located ultrasonic receiver detects any reflected ultrasonic signals from the pulsed or continous ultrasonic signal that exceed a particular amplitude threshold and furthermore provides either an electronic analog signal of said reflected ultrasonic signals with said electronic analog signal being processed by electronic circuit components wherein a signal of appreciable amplitude is produced whenever any said reflected ultrasonic signals exceed said amplitude threshold.

* * * * *